(12) United States Patent
Shapiro et al.

(10) Patent No.: US 11,978,346 B2
(45) Date of Patent: May 7, 2024

(54) AUTONOMOUS AIR TRAFFIC CONTROL INTERACTION

(71) Applicant: Rockwell Collins, Inc., Cedar Rapids, IA (US)

(72) Inventors: Geoffrey A. Shapiro, Cedar Rapids, IA (US); Katarina Vuckovic, W Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 176 days.

(21) Appl. No.: 17/723,726

(22) Filed: Apr. 19, 2022

(65) Prior Publication Data

US 2023/0334991 A1  Oct. 19, 2023

(51) Int. Cl.
*G08G 5/00*  (2006.01)
*G10L 15/26*  (2006.01)

(52) U.S. Cl.
CPC ............ *G08G 5/0021* (2013.01); *G10L 15/26* (2013.01)

(58) Field of Classification Search
CPC .................................................. G08G 5/0021
See application file for complete search history.

(56) References Cited

U.S. PATENT DOCUMENTS

| | | | |
|---|---|---|---|
| 7,580,377 B2 | 8/2009 | Judd | |
| 7,809,405 B1 | 10/2010 | Rand et al. | |
| 7,912,592 B2 * | 3/2011 | Komer | G10L 15/26 |
| | | | 701/3 |
| 9,401,758 B2 | 7/2016 | Bosworth | |
| 9,824,689 B1 * | 11/2017 | Shapiro | G10L 15/22 |
| 9,830,910 B1 | 11/2017 | Shapiro et al. | |
| 10,877,488 B1 | 12/2020 | Liu et al. | |
| 11,838,448 B2 * | 12/2023 | Burd | H04M 3/563 |
| 2007/0129855 A1 | 6/2007 | Coulmeau | |
| 2008/0065275 A1 | 3/2008 | Vizzini | |
| 2010/0030401 A1 | 2/2010 | Rogers et al. | |

(Continued)

FOREIGN PATENT DOCUMENTS

| | | |
|---|---|---|
| EP | 3109857 A1 | 12/2016 |
| EP | 2717018 A2 | 11/2018 |

(Continued)

OTHER PUBLICATIONS

Extended European Search Report dated Jan. 29, 2024; European Application No. 23164803.1.

*Primary Examiner* — Travis R Hunnings
(74) *Attorney, Agent, or Firm* — Suiter Swantz IP

(57) ABSTRACT

A system includes a radio configured to transmit and receive voice transmissions to and from air traffic control (ATC), the radio installed onboard an aircraft. The system includes a processor communicatively coupled to the radio and installed onboard the aircraft. The processor is configured to: receive an ATC voice command via the radio; transcribe the ATC voice command into an ATC command; and when the ATC command includes an aircraft identification associated with the aircraft, categorize the ATC command into components, each of the components being categorized based on a criticality level associated with said component, wherein the criticality level is or is associated with a required accuracy confidence level of transcribed speech for a given component.

20 Claims, 6 Drawing Sheets

(56) References Cited

U.S. PATENT DOCUMENTS

| | | | |
|---|---|---|---|
| 2015/0081138 A1* | 3/2015 | Lacko | B64D 45/00 |
| | | | 701/3 |
| 2016/0063999 A1 | 3/2016 | Gaston et al. | |
| 2017/0039858 A1* | 2/2017 | Wang | G10L 15/08 |
| 2019/0033861 A1 | 1/2019 | Groden et al. | |
| 2021/0020168 A1 | 1/2021 | Dame et al. | |
| 2021/0183360 A1 | 6/2021 | Ebrahimifard et al. | |
| 2021/0225371 A1 | 7/2021 | Takacs et al. | |
| 2021/0233411 A1 | 7/2021 | Saptharishi et al. | |

FOREIGN PATENT DOCUMENTS

| | | |
|---|---|---|
| EP | 3073467 A1 | 12/2019 |
| EP | 3738888 A1 | 12/2021 |
| WO | 1998012685 A1 | 3/1998 |

\* cited by examiner

AUTONOMOUS AIR TRAFFIC CONTROL INTERACTION

BACKGROUND

The future of commercial aviation is likely to require operations with less flight crew than current aircraft. This journey begins by reducing crew on long haul operations, known as reduced crew operation (RCO) or single pilot operations. In this configuration, crew is reduced from three to five pilots to two with each alternating rest during cruise. This is followed by single pilot operation (SPO) in which only one pilot operates the aircraft during all phases of flight.

Today, pilots communicate with air traffic control (ATC) via several different communication systems: 1) very high frequency (VHF) radios, 2) high frequency (HF) radios, or 3) satellite communication (SATCOM) radios. This communication between the pilot and the ATC operator can either be over voice or data link transmissions. The purpose of ATC is to manage air traffic flow and to provide the pilot with information and other support.

While data link communication is easily understood by aircraft systems, it is not yet available globally. Additionally, while the human pilot today processes ATC requests for feasibility and acceptance, there is no such system to complete this task autonomously. Among the many autonomous systems required to be developed to support SPO and autonomous operation is a communications manager that can perform the same duties (communication and decision making) with the same reliability as a human pilot.

Additionally, existing approaches to utilize speech recognition to understand ATC commands have failed to meet two important certification conditions: 1) system must work as well as an average pilot's ability to discern ATC commands over a radio (approximately $10^{-5}$ failure rate) and 2) system and supporting software must be certifiable.

Current speech recognition systems can achieve up to 98%, but that falls far short of a $10^{-5}$ failure rate. Furthermore, speech recognition algorithms that carry a wide grammar and high accuracy, use complex and non-deterministic approaches (Markov models, neural networks etc.). These software methods have no approved federal regulatory method for aircraft certification verification.

SUMMARY

In one aspect, embodiments of the inventive concepts disclosed herein are directed to a system. The system may include a radio configured to transmit and receive voice transmissions to and from air traffic control (ATC), the radio installed onboard an aircraft. The system may include a processor communicatively coupled to the radio and installed onboard the aircraft. The processor may be configured to: receive an ATC voice command via the radio; transcribe the ATC voice command into an ATC command; and when the ATC command includes an aircraft identification associated with the aircraft, categorize the ATC command into components, each of the components being categorized based on a criticality level associated with said component, wherein the criticality level is or is associated with a required accuracy confidence level of transcribed speech for a given component.

In a further aspect, embodiments of the inventive concepts disclosed herein are directed to a method. The method may include: receiving, by at least one processor, an air traffic control (ATC) voice command via a radio, the at least one processor communicatively coupled to the radio, the at least one processor and the radio installed onboard an aircraft, the radio configured to transmit and receive voice transmissions to and from ATC; transcribing, by the at least one processor, the ATC voice command into an ATC command; and when the ATC command includes an aircraft identification associated with the aircraft, categorizing, by the at least one processor, the ATC command into components, each of the components being categorized based on a criticality level associated with said component, wherein the criticality level is or is associated with a required accuracy confidence level of transcribed speech for a given component.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION

Figure 1:
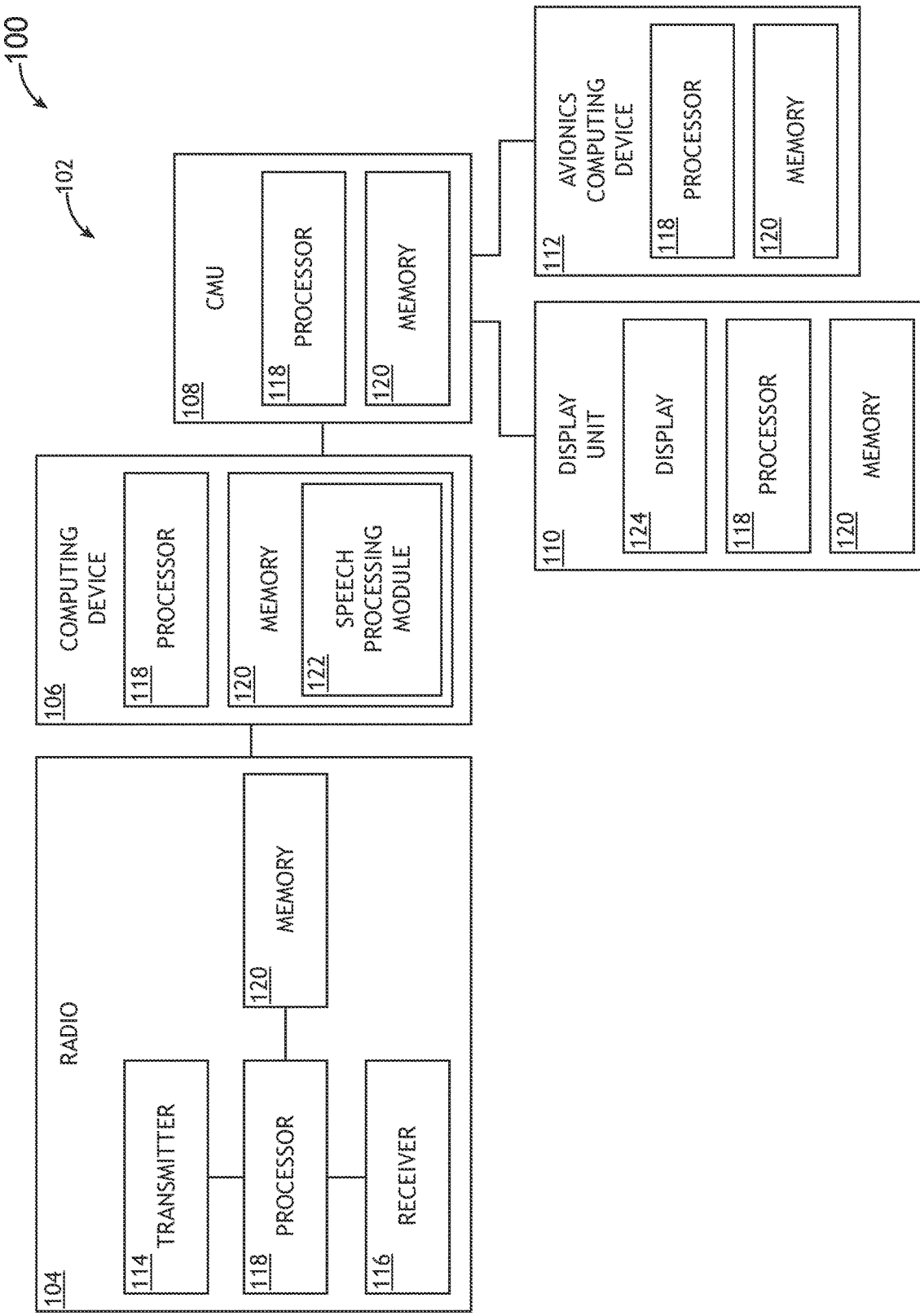
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method for autonomous air traffic control interaction.

Some embodiments may reduce pilot workload, which can improve flight safety and improve pilot situational awareness. Some embodiments may improve accuracy of correctly inputting ATC commands into a computing device of an aircraft, which improves the functioning of the aircraft, itself and improves flight safety. Some embodiments may use a speech recognition system to achieve a failure rate (such as a $10^{-6}$ failure rate) that is less than the $10^{-5}$ failure rate for occurrence of a pilot incorrectly inputting an ATC command.

Some embodiments an aircraft to communicate with ATC without human interaction in events when an aircraft is not equipped with a pilot for duty or when a pilot is incapacitated.

Some embodiments allow for requisite accuracy and verification to provide certifiable speech recognition system functionality, which can reduce a size of a flight crew or eliminate the need for a pilot. Such embodiments feasibly allow for use of a speech recognition system without pilot intervention.

Currently, speech recognition systems (SRSs) achieve 50% to 98% recognition rate over aviation radios, which is considered state of the art but insufficient to perform safely within an aircraft environment. In some embodiments, the SRS can prompt ATC controllers to repeat unrecognized commands giving multiple attempts to be recognized with each subsequent attempt said differently (e.g., slower and/or annunciated slightly differently) per the SRS command to ATC. Some embodiments may raise SRS performance from a current accuracy rate to a failure occurrence rate of about $10^{-5}$; this assumes that each subsequent attempt has a 98% chance of successful recognition.

Current SRS algorithms use Markov Decision Processes or Neural Networks. Both current approaches cannot be verified using Federal Aviation Administration (FAA) approved techniques as there has yet to be an established method due to the non-deterministic nature of these algorithms. The SRS may be safety critical for flights, yet SRS cannot currently be trusted as the core algorithms are not certifiable. Some embodiments provide a solution to this certification issue by using two techniques. For example, ATC may review and approve or reject each directive given to the aircraft in the form of a readback and confirmation. Some embodiments, may include a specially tailored function within the SRS that may constrain the grammar to only very few options tied directly to command acceptance, readback correct, readback incorrect, and the aircraft tail number; whereas, other SRS algorithms are tailored to cover the remaining universe of possible grammar but utilize the ATC confirmation as a check. By constraining the system to a very small grammar set, an accuracy can be increased as significantly fewer options are possible. The constrained algorithms may enable a deterministic high accuracy approach which in turn may enable a traditional certification process. An executive decision-making module (EDMM) software function may ensure that the ATC requests are safe to execute providing another level of system safety and security.

Some embodiments may use multiple SRS algorithms for different categories of grammar to achieve a high accuracy and establish a verifiable certification approach.

In some embodiments, the SRS may utilize more than a simple grammar transcription by coupling the transcription with the EDMM to create a robust communication and decision engine that can communicate and understand how ATC requested changes will affect the aircraft mission.

Pilots currently use each other as methods to ensure errors are not made. They do this by utilizing Crew Resource Management (CRM), a technique where a pilot will make a safety critical change, and the other crew member confirms the change was made correctly. The error checking is an important safety consideration as it is proven to reduce accidents. As single pilot operation necessitates only one crew member in the flight deck, meaning the challenge/response paradigm used in CRM is not effective. Coupling the pilot with the SRS enables an additional error check. When used in this way the SRS can compare what ATC spoke against what was entered into the system (by the pilot) ensuring there are no errors.

Some embodiments have ability of the SRS to automatically load an ATC command into the avionics system as this scheme reduces a single pilot workload.

Figure 2:
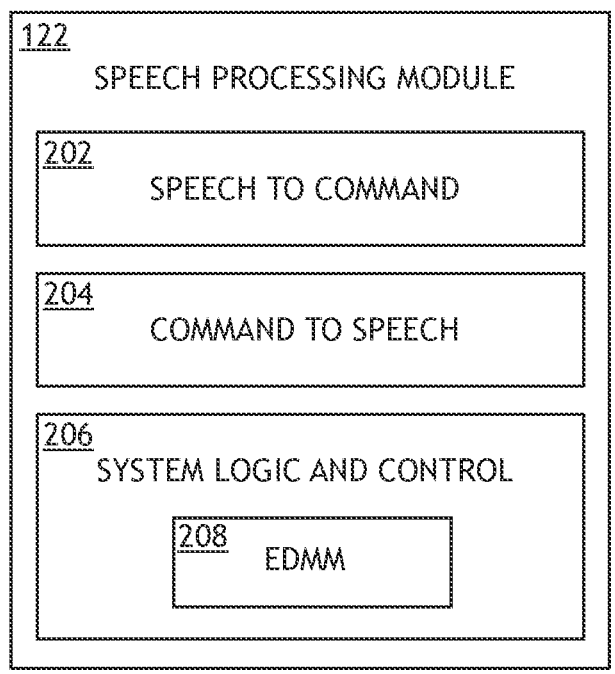
FIG. 2 is a view of an exemplary embodiment of a speech processing module of FIG. 1 according to the inventive concepts disclosed herein.

Referring now to FIGS. 1-2, an exemplary embodiment of a system 100 according to the inventive concepts disclosed herein is depicted. In some embodiments, the system 100 may include an aircraft 102 and an ATC 126 (show in FIGS. 3-5), some or all of which may be communicatively coupled at any given time. The aircraft 102 may include at least one user (e.g., flight crew and/or pilot(s)), at least one radio 104, at least one computing device 106, at least one communication management unit (CMU) computing device 108, at least one display unit computing device 110, and/or at least one avionics computing device 112, some or all of which may be communicatively coupled at any given time. In some embodiments, the at least one radio 104, the at least one computing device 106, the at least one CMU computing device 108, the at least one display unit computing device 110, and/or the at least one avionics computing device 112 may be implemented as a single computing device or any number of computing devices configured to perform (e.g., collectively perform if more than one computing device) any or all of the operations disclosed throughout. For example, the at least one radio 104, the at least one computing device 106, the at least one CMU computing device 108, the at least one display unit computing device 110, and/or the at least one avionics computing device 112 may be installed in the aircraft 102. In some embodiments, the at least one display unit computing device 110 and/or a user (e.g., a remote pilot or remote crewmember) may be located offboard of the aircraft 102, for example, if a given aircraft 102 is a remote piloted aircraft (e.g., an unmanned aerial vehicle (UAV) or a drone aircraft).

For example, the user may be a pilot or crew member. The user may interface with the system 100 via the at least one user interface. The at least one user interface may be implemented as any suitable user interface, such as a control panel, a touchscreen (e.g., of the display unit computing device 110 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface may be configured to receive at least one user input and to output the at least one user input to a computing device (e.g., 104, 106, 108, 110, and/or 112). For example, a pilot of the aircraft 102 may be able to interface with the user interface to: make a user selection and/or confirm or reject an ATC command. In some embodiments, when acting autonomously, a pilot entered command is optional and/or not required.

The at least one radio 104 may be implemented as any suitable radio configured to transmit and/or receive voice and/or data transmissions to and from ATC 126. For example, the radio 104 may be a very high frequency (VHF) radio, a high frequency (HF) radio, and/or a satellite communication (SATCOM) radio. The at least one radio 104 may include at least one processor 118, at least one memory 120, at least one transmitter 114, and/or at least one receiver 116, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 118 may include an FPGA configured to perform (e.g., collectively perform) any of the operations disclosed throughout. The processor 118 may be configured to run various software applications or computer code stored (e.g., maintained) in a non-transitory computer-readable medium (e.g., memory 120) and configured to execute various instructions or operations. The processor 118 may be configured to perform any or all of the operations disclosed throughout. For example, the processor 118 of the radio 104 may be configured to: receive an ATC voice command via the receiver 116; output the ATC voice command to another computing device (e.g., the computing device 106); receive a voice and/or data command from another computing device (e.g., the computing device 106); and/or output the voice and/or data command for transmission to the ATC 126 via the transmitter 116.

The at least one computing device 106 may be implemented as any suitable computing device. The computing device 106 may include at least one processor 118, and/or at least one memory 120, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 118 may include a CPU, an FPGA, and/or a GPU configured to perform (e.g., collectively perform) any of the operations disclosed throughout. The processor 118 may be configured to run various software applications (e.g., a speech processing module 122) or computer code stored (e.g., maintained) in a non-transitory computer-readable medium (e.g., memory 120) and configured to execute various instructions or operations. The processor 118 may be configured to perform any or all of the operations disclosed throughout. For example, the processor 118 may be configured to: receive an ATC voice command via the radio 104; transcribe the ATC voice command into an ATC command (e.g., a textual command); and/or when the ATC command includes an aircraft identification associated with the aircraft 102, categorize the ATC command into components, each of the components being categorized based on a criticality level associated with said component, wherein the criticality level is or is associated with a required accuracy confidence level of transcribed speech for a given component.

In some embodiments, the processor 118 of the computing device 106 may be further configured to: determine that each component of the components meets the required accuracy confidence level; upon a determination that each component of the components meets the required accuracy confidence level, ensure that the ATC command is able to be executed safely and achieve pilot goals; upon the ensuring, output a readback of the ATC command to the ATC 126 as voice data, via the radio 104, such that the ATC 126 is able to confirm accuracy of the aircraft's 102 receipt and transcription of the ATC voice command; receive, via the radio 104, a confirmation from the ATC 126 that the readback is accurate; and/or execute the ATC command.

In some embodiments, the processor 118 of the computing device 106 may be further configured to: upon an occurrence of a particular component of the components failing to meet the required accuracy confidence level, output a voice command to the ATC 126, via the radio 104, to request that ATC 126 repeat, at least once, the ATC voice command to the aircraft 102. In some embodiments, the processor 118 of the computing device 106 may be further configured to: upon a reoccurrence of the particular component of the components failing to meet the required accuracy confidence level a predetermined number of times, execute a lost communication mode.

In some embodiments, the processor 118 of the computing device 106 may be further configured to: determine that each component of the components meets the required accuracy confidence level; upon a determination that each component of the components meets the required accuracy confidence level, attempt to ensure that the ATC command is able to be executed safely and achieve pilot goals; and/or upon a failed attempt to ensure that ATC command is able to be executed safely and achieve pilot goals, calculate an alternative safe route. In some embodiments, the processor 118 of the computing device 106 may be further configured to: generate an alternative voice command corresponding to the alternative safe route; and/or output the alternative voice command to the ATC 126, via the radio 104, to request that ATC approve the alternative voice command. In some embodiments, the processor 118 of the computing device 106 may be further configured to: receive an ATC voice approval of the alternative voice command via the radio 104; and/or execute the alternative voice command. In some embodiments, the processor 118 of the computing device 106 may be further configured to: fail to receive an ATC voice approval of the alternative voice command via the radio 104; calculate an additional alternative safe route; generate an additional alternative voice command corresponding to the additional alternative safe route; and/or output the additional alternative voice command to the ATC 126, via the radio 104, to request that ATC 126 approve the additional alternative voice command. In some embodiments, the processor 118 of the computing device 106 may be further configured to: upon a predetermined number of consecutive failures to receive the ATC voice approval of the alternative voice command or at least one subsequent alternative voice command via the radio, determine an occurrence of an abnormal condition (e.g., a loss of communication) calculate a loss of communication route; generate a loss of communication voice intent corresponding to the loss of communication safe route; output the loss of communication voice intent to the ATC 126, via the radio 104; and/or output an loss of communication digital intent message to the ATC 126, via the radio 104.

In some embodiments, the processor 118 of the computing device 106 may be further configured to: transcribe speech to a command; convert a data command to speech; control a flow of data; ensure that commands are safe and/or align with predetermined aircraft and/or airline goals; inform relevant systems (e.g., computing devices 104, 106, 108 110, and/or 112) of activity by execution of the speech processing module; output the ATC command to at least one designated avionics computing device 112; and/or receive data from at least one avionics computing device 112, wherein the data is used to ensure that the commands are safe and/or align with predetermined aircraft and/or airline goals. In some embodiments, the processor 118 of the computing device 106 may be further configured to: receive situation awareness data related to an environment around the aircraft 102, an airspace around the aircraft 102, and the aircraft 102, itself; monitor the situation awareness data; based on monitoring the situation awareness data, identify an occurrence of an unsafe situation; and/or in response to the identification of the occurrence of the unsafe or undesirable situation, determine and output safe executable options. In some embodiments, the processor 118 of the computing device 106 may be further configured to: determine whether an ATC requested clearance is feasible based at least on whether a route is free from threats and whether the aircraft 102 is able to achieve the route and/or align with predetermined aircraft and/or airline goals; and/or upon a determination that the ATC requested clearance is unfeasible, generate and output at least one alternative route. In some embodiments, the processor 118 of the computing device 106 may be further configured to: upon an occurrence of an aircraft system failure, output an impact report of the aircraft system failure and output at least one potential action to mitigate the aircraft system failure. In some embodiments, the processor 118 of the computing device 106 may be further configured to: generate and output an abnormal condition or emergency landing command, wherein the abnormal condition or emergency landing command includes at least one of: a selected airport, a selected runway of the selected airport, or a path to travel to the selected airport. In some embodiments, the processor 118 of the computing device 106 may be further configured to: generate and output an abnormal condition or emergency landing command, wherein the abnormal condition or emergency landing command includes at least one of: a selected airport, a selected runway of the selected airport, or a path to travel to the selected airport In some embodiments, the ATC command includes the aircraft identification and the components, wherein the components may include at least one of: an ATC identification, a heading change, an altitude change, an advisory, a clearance message, a fuel request, a taxi to message, or a frequency change.

In some embodiments, the criticality level is one of a plurality of criticality levels, the plurality of criticality levels including at least one of: a safety-critical phrase segment, an advisory phrase segment, or an unrelated phrase segment.

In some embodiments, wherein the ATC command includes the aircraft identification and the components, wherein software executed by the at least one processor 118 uses a basic vocabulary associated with the aircraft identification, the components, and other correspondence voice commands associated with communication between the aircraft and the ATC allows the system to be certifiable by the Federal Aviation Administration (FAA) because the software includes a speech processing module 122 enabling accurate recognition of ATC commands that works as well as an average pilot's ability to discern ATC commands over a radio.

As shown in FIG. 2, the speech processing module 122 is exemplarily hosted by the computing device 106; however, in some embodiments, the speech processing module 122 may be hosted by any suitable computing device, such as the radio 104, the CMU computing device 108, the display unit computing device 110, and/or the avionics computing device 112. In some embodiments, execution of the speech processing module 122 may cause performance of any or all of the operations disclosed throughout. For example, the speech processing module 122 may include the following components: speech to command 202 configured to transcribe and parse speech into an actionable command; command to speech 204 configured to generate synthesized speech for responses to ATC 126; and/or system logic and control 206. The system logic and control 206 may control a flow of data and ensure that executing a command is safe and that all systems involved are informed. The system logic and control 206 may include an executive-decision making module (EDMM) 208. The system logic and control 206 may interact by transmitting commands requested by the ATC 126 designated avionics applications. The system logic and control 206 may also receive information from the avionics application required for the EDMM 208 to make a safety and flight assessment; for example, the EDMM 208 may evaluate many aircraft and/or airline goals, such as safety, keeping schedules, optimized fuel, and/or etc. In some embodiments, the transcribed message (e.g., the ATC command) may be displayed to the pilot by the display unit computing device 110, which may be connected to the CMU computing device 108. The display unit computing device 110 may function as an interface between the pilot and the speech processing module 122; however, the pilot's input may be optional. In some embodiments, where the pilot is not incapacitated and where the system is not operating fully autonomous, the pilot may confirm, reject, and/or alter a received ATC command. The system logic and control 206 may receive the pilot feedback and respond accordingly to the ATC 126 and/or the avionics applications.

In some embodiments, the EDMM 208 may be responsible for ensuring safe options are presented to flight crew for execution. The EDMM 208 may be fed situation awareness data about an environment, airspace, and the aircraft 102. The EDMM 208 may monitor such situation awareness data. When situations arise where crew action would typically be required, the EDMM 208 may provide safe options for the crew to consider or, in the absence of crew, execute autonomously.

The CMU computing device 108 may be implemented as any suitable computing device. As shown in FIG. 1, the CMU computing device 108 may include at least one processor 118 and/or at least one memory 120, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 118 may include a CPU and a GPU configured to perform (e.g., collectively perform) any of the operations disclosed throughout. The processor 118 may be configured to run various software applications or computer code stored (e.g., maintained) in a non-transitory computer-readable medium (e.g., memory 120) and configured to execute various instructions or operations. The processor 118 may be configured to perform any or all of the operations disclosed throughout. For example, the processor 118 may be configured to: route commands (e.g., ATC commands) and/or situation awareness data between and/or among any or all of the computing devices (e.g., 104, 106, 110, and/or 112) onboard the aircraft 102.

The display unit computing device 110 may be implemented as any suitable computing device, such as a primary flight display (PFD) computing device and/or a multi-function control display unit (MCDU) computing device. As shown in FIG. 1, the display unit computing device 110 may include at least one display 124, at least one processor 118, and/or at least one memory 120, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 118 may include a CPU and a GPU configured to perform (e.g., collectively perform) any of the operations disclosed throughout. The processor 118 may be configured to run various software applications (e.g., a PFD application, and/or an MCDU application) or computer code stored (e.g., maintained) in a non-transitory computer-readable medium (e.g., memory 120) and configured to execute various instructions or operations. The processor 118 may be configured to perform any or all of the operations disclosed throughout. For example, the display 124 may be configured to display graphical information associated with ATC commands.

The avionics computing device 112 may be implemented as any suitable computing device, such as a flight management system (FMS) computing device. As shown in FIG. 1, the avionics computing device 112 may include at least one processor 118 and/or at least one memory 120, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 118 may include a CPU and a GPU configured to perform (e.g., collectively perform) any of the operations disclosed throughout. The processor 118 may be configured to run various software applications (e.g., an FMS application) or computer code stored (e.g., maintained) in a non-transitory computer-readable medium (e.g., memory 120) and configured to execute various instructions or operations. The processor 118 may be configured to perform any or all of the operations disclosed throughout. For example, the processor 118 may be configured to: provide situation awareness data to the computing device 106; and/or receive ATC commands or other commands from the computing device 106.

For example, at least one processor 118 (e.g., of the at least one radio 104, the at least one computing device 106, the at least one CMU computing device 108, the at least one display unit computing device 110, and/or the at least one avionics computing device 112) may be configured to (e.g., collectively configured to, if more than one processor): receive an ATC voice command via the radio 104; transcribe the ATC voice command into an ATC command (e.g., a textual command); and/or when the ATC command includes an aircraft identification associated with the aircraft 102, categorize the ATC command into components, each of the components being categorized based on a criticality level associated with said component, wherein the criticality level is or is associated with a required accuracy confidence level of transcribed speech for a given component. Additionally, for example, at least one processor 118 (e.g., of the at least one radio 104, the at least one computing device 106, the at least one CMU computing device 108, the at least one display unit computing device 110, and/or the at least one avionics computing device 112) may be configured to (e.g., collectively configured to, if more than one processor) perform any or all of the operations disclosed throughout.

Figure 3:
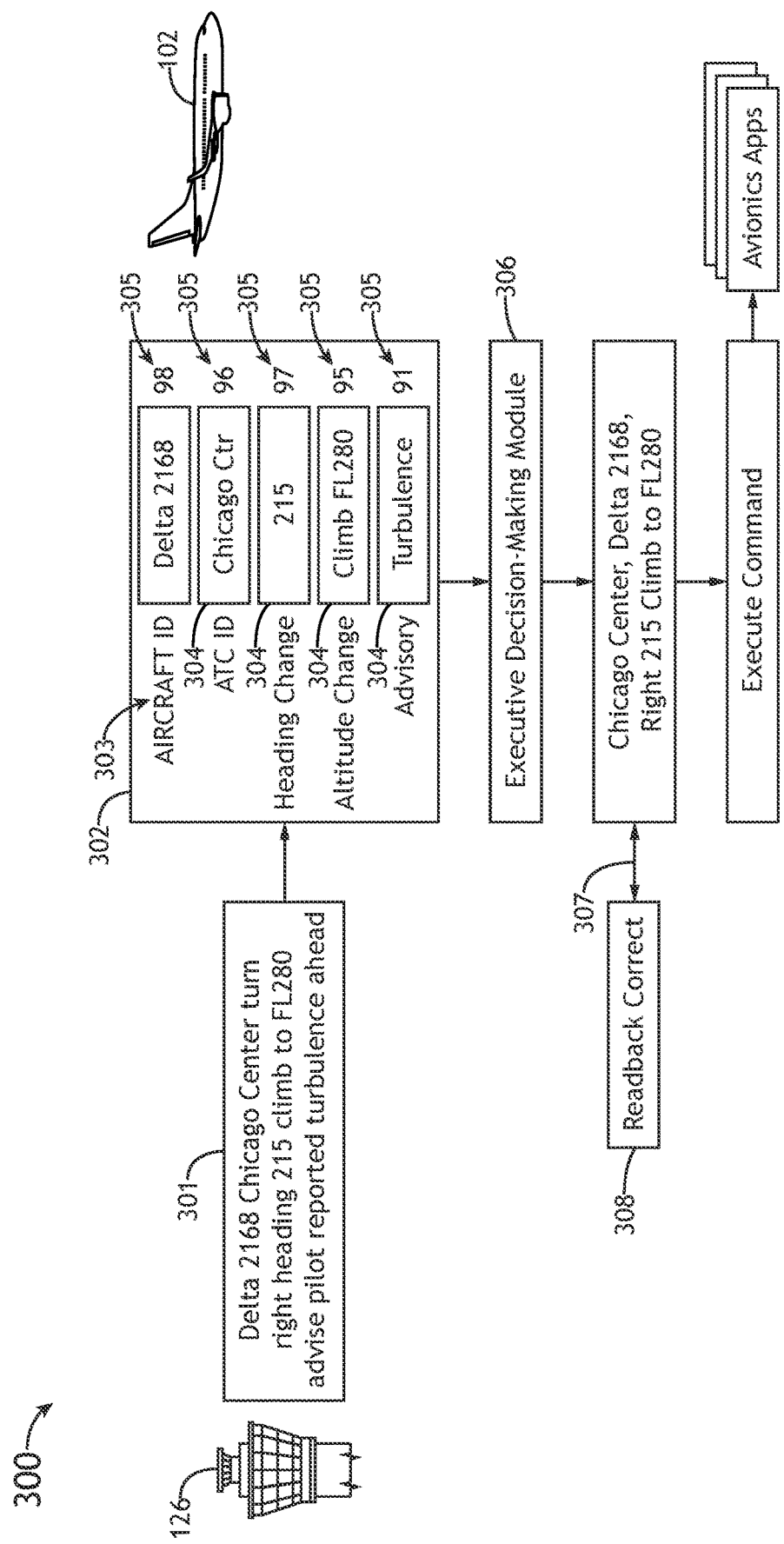
FIG. 3 is a diagram of an exemplary embodiment of a method according to the inventive concepts disclosed herein.

Referring now to FIG. 3, a diagram associated with an exemplary embodiment of a method 300 according to the inventive concepts disclosed herein is depicted. FIG. 3 depicts an ATC communication example when the speech recognition system (SRS) (e.g., the computing device 106, as shown in FIG. 1) correctly understands an ATC command.

A step 301 may include ATC 126 speaking a command that is broadcast to the radio 104.

In a step 302, the aircraft radio 104 may receive the ATC message, and may send the audio stream to the SRS.

In a step 303, the SRS may listen for an own-ship aircraft ID (tail number or air carrier designation).

In a step 304, when the SRS indicates that the correct aircraft ID is in the audio stream, then the SRS decodes the audio string into smaller components, and each may be assigned one of a plurality of (e.g., three) categories based on criticality levels: safety critical phrase-segment, advisory phrase-segment, and a non-related phrase-segment.

In a step 305, each category of command may have an associated failure metric that once met will trigger a 'SRS failure' initiating a request to ATC 126 to 'say again slowly'.

In a step 306, if each command passes the failure check, then computer readable SRS output is passed into the EDMM 208. This function may ensure that the ATC 126 command can be executed safely and achieve pilot goals.

In a step 307, once the EDMM 208 has given approval to the ATC command, the EDMM 208 may create a 'readback' confirmation, which the SRS then reads the 'readback' to ATC 126.

In a step 308, the SRS may listen for ATC 126 to say over the radio, "readback correct" (or does not comment that the readback is incorrect), which if spoken the SRS executes the command else ATC is prompted to 'readback again slower'; ATC will not always confirm, but will always indicate when the readback is incorrect.

Figure 4:
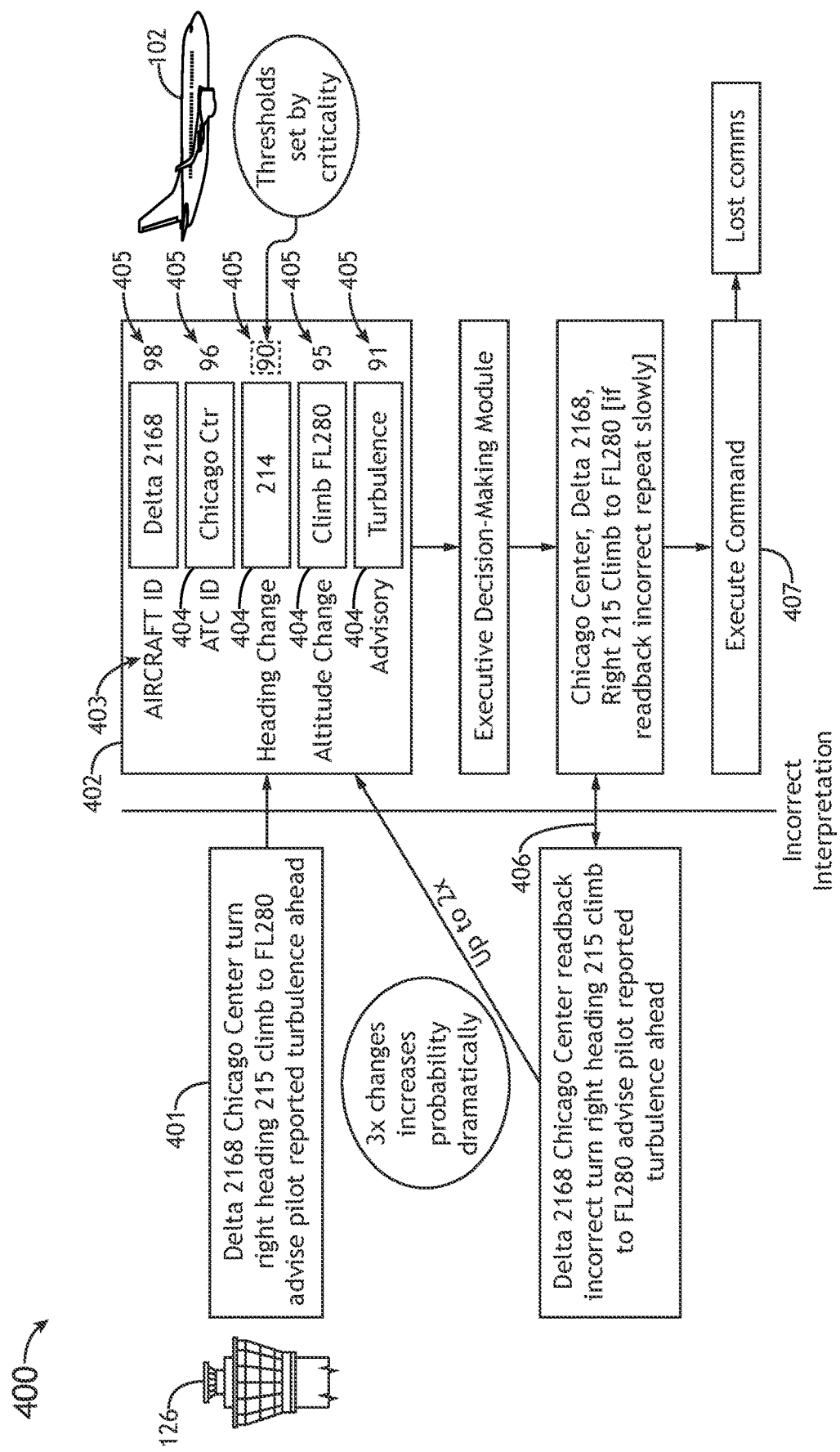
FIG. 4 is a diagram of an exemplary embodiment of a method according to the inventive concepts disclosed herein.

Referring now to FIG. 4, a diagram associated with an exemplary embodiment of a method 400 according to the inventive concepts disclosed herein is depicted. FIG. 4 depicts an ATC communication example when the speech recognition system (SRS) (e.g., the computing device 106, as shown in FIG. 1) at least initially fails to understand an ATC command.

A step 401 may include ATC 126 speaking a command that is broadcast to the radio 104.

In a step 402, the aircraft radio 104 may receive the ATC message, and may send the audio stream to the SRS.

In a step 403, the SRS may listen for an own-ship aircraft ID (tail number or air carrier designation).

In a step 404, when the SRS indicates that the correct aircraft ID is in the audio stream, then the SRS decodes the audio string into smaller components, and each may be assigned one of a plurality of (e.g., three) categories based on criticality levels: safety critical phrase-segment, advisory phrase-segment, and a non-related phrase-segment.

In a step 405, each category of command may have an associated failure metric that once met will trigger a 'SRS failure' initiating a request to ATC 126 to 'say again slowly'.

In a step 406, the ATC controller may be asked to make a predetermined number of (e.g., three) attempts to say a command and have the SRS system recognize the command.

In a step 407, if the predetermined number of failed attempts are made, the system may enter a 'lost communication mode', which is a coordinated procedure that exists today for lost communication. The EDMM 208 may calculate if the aircraft 102 can make the original flight plan. Then, if able, the SRS may announce via the radio and digital backup communication messages the aircraft's 102 intention to land as planned. If the EDMM 208 indicates the original plan cannot be accomplished safely, the EDMM 208 may create a safe alternative and announces these intentions via the transmit function of the radio 104 and digital backup communication messages.

Figure 5:
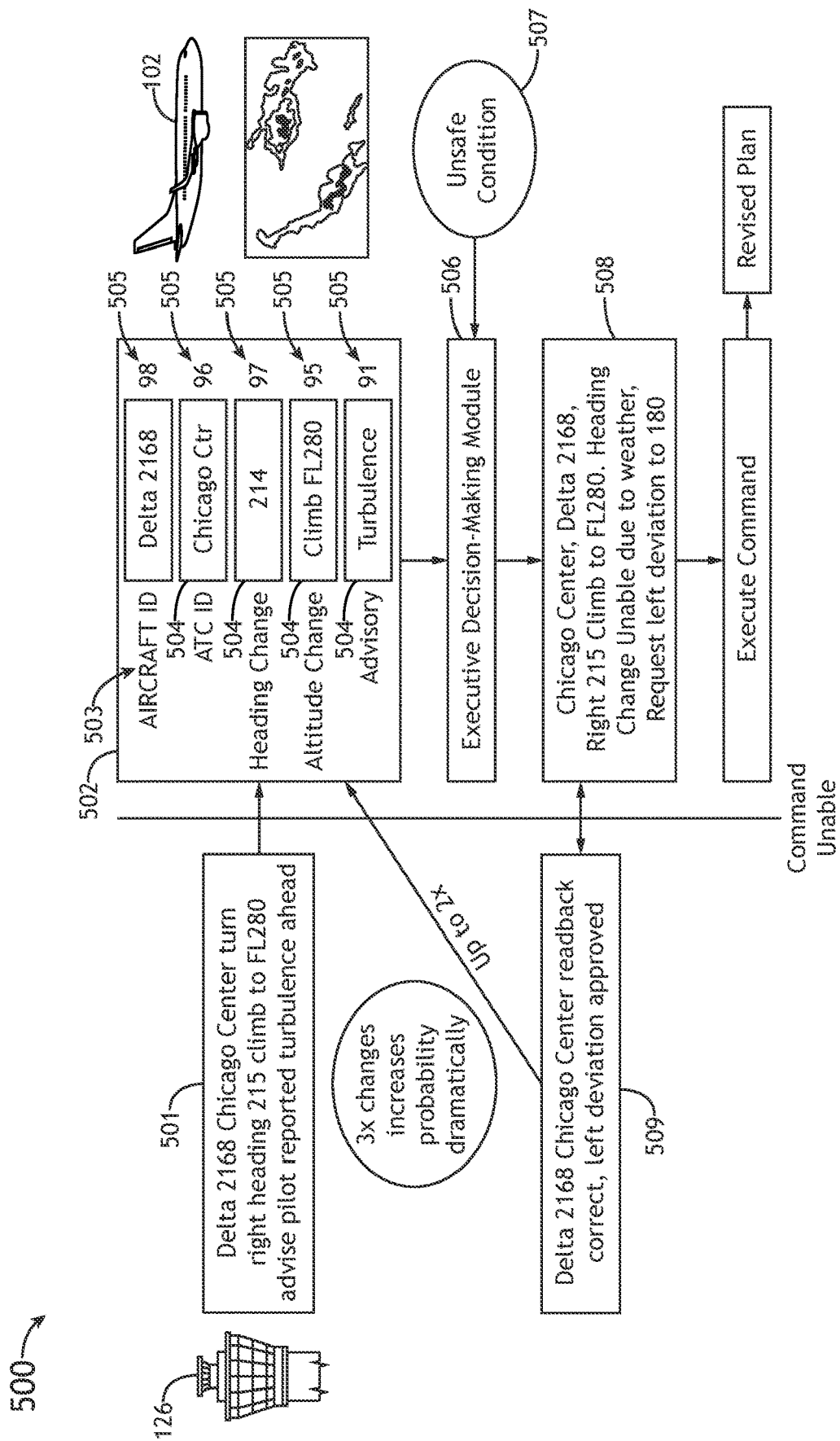
FIG. 5 is a diagram of an exemplary embodiment of a method according to the inventive concepts disclosed herein.

Referring now to FIG. 5, a diagram associated with an exemplary embodiment of a method 500 according to the inventive concepts disclosed herein is depicted. FIG. 5 depicts an ATC communication example where ATC 126 asks the aircraft 102 to accomplish a command that the aircraft 102 correctly interprets but is unable to comply with due to safety concerns. In this example, the ATC 126 may send a request to the pilot to make a turn placing the aircraft 102 in a direct path of dangerous weather.

A step 501 may include ATC 126 speaking a command that is broadcast to the radio 104.

In a step 502, the aircraft radio 104 may receive the ATC message, and may send the audio stream to the SRS.

In a step 503, the SRS may listen for an own-ship aircraft ID (tail number or air carrier designation).

In a step 504, when the SRS indicates that the correct aircraft ID is in the audio stream, then the SRS decodes the audio string into smaller components, and each may be assigned one of a plurality of (e.g., three) categories based on criticality levels: safety critical phrase-segment, advisory phrase-segment, and a non-related phrase-segment.

In a step 505, each category of command may have an associated failure metric that once met will trigger a 'SRS failure' initiating a request to ATC 126 to repeat the previous command and asking controllers to slow speech.

In a step 506, if each command passes the failure check, then computer readable SRS output may be passed into the EDMM 208. The EDMM 208 may be a software function that ensures that the ATC command can be executed safely and achieve pilot goals.

In a step 507, the EDMM 208 may indicate this route is not safe and calculate an alternative which is passed to the SRS.

In a step 508, the SRS may decompose the request from EDMM 208 and create a human understandable phrase which is then spoken to the ATC 126.

In a step 509, if ATC 126 states via radio readback that the alternative is approved, then the SRS may execute the command.

If ATC states via radio readback that the alternative is not-approved, then the SRS system may consider the revised ATC commands and restart this procedure. This process may be applicable for any safety critical command.

If this series of events, occurs a predetermined number (e.g., 4) times then the aircraft may declare an emergency, and the EDMM 208 may execute a safe command and broadcast intentions via radio 104 and digital backup communication messages.

Figure 6:
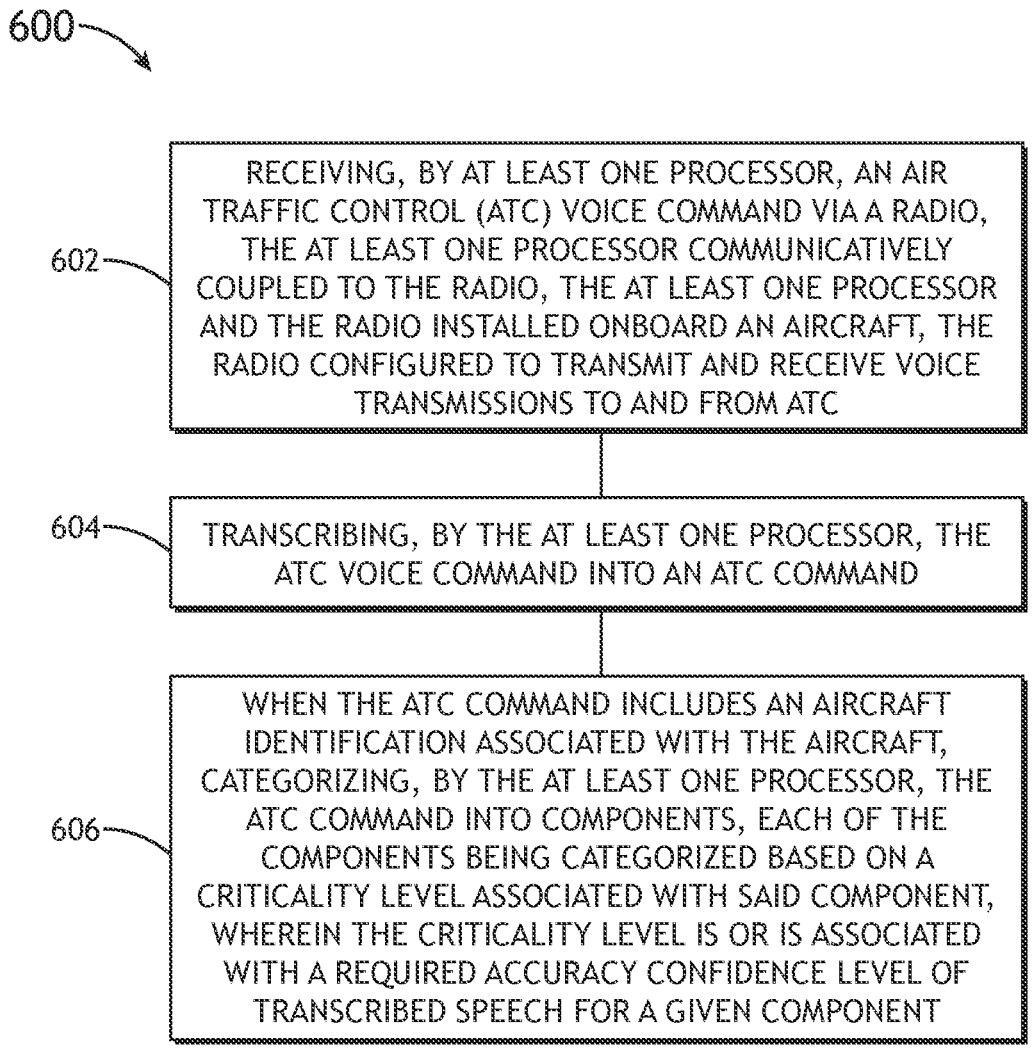
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include receiving, by at least one processor, an air traffic control (ATC) voice command via a radio, the at least one processor communicatively coupled to the radio, the at least one processor and the radio installed onboard an aircraft, the radio configured to transmit and receive voice transmissions to and from ATC.

A step 604 may include transcribing, by the at least one processor, the ATC voice command into an ATC command.

A step 606 may include when the ATC command includes an aircraft identification associated with the aircraft, categorizing, by the at least one processor, the ATC command into components, each of the components being categorized based on a criticality level associated with said component, wherein the criticality level is or is associated with a required accuracy confidence level of transcribed speech for a given component.

Further, the method 600 may include any of the operations disclosed throughout.

As will be appreciated from the above, embodiments of the inventive concepts disclosed herein may be directed to a system (e.g., an aircraft system) and a method for autonomous ATC interaction.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a radio configured to transmit and receive voice transmissions to and from air traffic control (ATC), the radio installed onboard an aircraft; and
at least one processor communicatively coupled to the radio, wherein the at least one processor is installed onboard the aircraft, the at least one processor configured to:
receive an ATC voice command via the radio;
transcribe the ATC voice command into an ATC command;
when the ATC command includes an aircraft identification associated with the aircraft, categorize the ATC command into components, each of the components being categorized based on a criticality level associated with said component, wherein the criticality level is or is associated with a required accuracy confidence level of transcribed speech for a given component;
transcribe speech to a command;
convert a data command to speech;
control a flow of data;
ensure that commands are safe;
inform relevant systems of activity by execution of the speech processing module;
output the ATC command to at least one designated avionics computing device; and
receive data from at least one avionics computing device, wherein the data is used to ensure that the commands are safe and align with predetermined aircraft and/or airline goals.

2. The system of claim 1, wherein the ATC command includes the aircraft identification and the components, wherein the components include at least one of: an ATC identification, a heading change, an altitude change, an advisory, a clearance message, a fuel request, a taxi to message, or a frequency change.

3. The system of claim 1, wherein the criticality level is one of a plurality of criticality levels, the plurality of criticality levels including at least one of: a safety-critical phrase segment, an advisory phrase segment, or an unrelated phrase segment.

4. The system of claim 1, wherein the at least one processor is further configured to: receive situation awareness data related to an environment around the aircraft, an airspace around the aircraft, and the aircraft; monitor the situation awareness data; based on monitoring the situation awareness data, identify an occurrence of an unsafe situation; and in response to the identification of the occurrence of the unsafe situation, determine and output safe executable options.

5. The system of claim 4, wherein the at least one processor is further configured to: determine whether an ATC requested clearance is feasible based at least on whether a route is free from threats and whether the aircraft is able to achieve the route and align with predetermined aircraft and/or airline goals; and upon a determination that the ATC requested clearance is unfeasible, generate and output at least one alternative route.

6. The system of claim 4, wherein the at least one processor is further configured to: upon an occurrence of an aircraft system failure, output an impact report of the aircraft system failure and output at least one potential action to mitigate the aircraft system failure.

7. The system of claim 4, wherein the at least one processor is further configured to: generate and output an abnormal condition or emergency landing command, wherein the abnormal condition or emergency landing command includes at least one of: a selected airport, a selected runway of the selected airport, or a path to travel to the selected airport.

8. The system of claim 1, wherein the at least one processor is further configured to: determine that each component of the components meets the required accuracy confidence level; upon a determination that each component of the components meets the required accuracy confidence level, ensure that the ATC command is able to be executed safely and achieve pilot goals; upon the ensuring, output a readback of the ATC command to the ATC as voice data, via the radio, such that the ATC is able to confirm accuracy of the aircraft's receipt and transcription of the ATC voice command; receive, via the radio, a confirmation from the ATC that the readback is accurate; and execute the ATC command.

9. The system of claim 1, wherein the at least one processor is further configured to: upon an occurrence of a particular component of the components failing to meet the required accuracy confidence level, output a voice command to the ATC, via the radio, to request that ATC repeat, at least once, the ATC voice command to the aircraft.

10. The system of claim 1, wherein the at least one processor is further configured to: determine that each component of the components meets the required accuracy confidence level; upon a determination that each component of the components meets the required accuracy confidence level, attempt to ensure that the ATC command is able to be executed safely and achieve pilot goals; and upon a failed attempt to ensure that ATC command is able to be executed safely and achieve pilot goals, calculate an alternative safe route.

11. The system of claim 1, wherein the ATC command includes the aircraft identification and the components, wherein software executed by the at least one processor uses a basic vocabulary associated with the aircraft identification, the components, and other correspondence voice commands associated with communication between the aircraft and the ATC allows the system to be certifiable by the Federal Aviation Administration (FAA) because the software includes a speech recognition module enabling accurate recognition of ATC commands that works as well as an average pilot's ability to discern ATC commands over a radio.

12. A method, comprising:
receiving, by at least one processor, an air traffic control (ATC) voice command via a radio, the at least one processor communicatively coupled to the radio, the at least one processor and the radio installed onboard an aircraft, the radio configured to transmit and receive voice transmissions to and from ATC;
transcribing, by the at least one processor, the ATC voice command into an ATC command;
when the ATC command includes an aircraft identification associated with the aircraft, categorizing, by the at least one processor, the ATC command into components, each of the components being categorized based on a criticality level associated with said component, wherein the criticality level is or is associated with a required accuracy confidence level of transcribed speech for a given component;
transcribing, by the at least one processor, speech to a command;
converting, by the at least one processor, a data command to speech;
controlling, by the at least one processor, a flow of data;
ensuring, by the at least one processor, that commands are safe;
informing, by the at least one processor, relevant systems of activity by execution of the speech processing module;
outputting, by the at least one processor, the ATC command to at least one designated avionics computing device; and
receiving, by the at least one processor, data from at least one avionics computing device, wherein the data is used to ensure that the commands are safe and align with predetermined aircraft and/or airline goals.

13. A system, comprising:
a radio configured to transmit and receive voice transmissions to and from air traffic control (ATC), the radio installed onboard an aircraft; and
at least one processor communicatively coupled to the radio, wherein the at least one processor is installed onboard the aircraft, the at least one processor configured to:
receive an ATC voice command via the radio;
transcribe the ATC voice command into an ATC command;
when the ATC command includes an aircraft identification associated with the aircraft, categorize the ATC command into components, each of the components being categorized based on a criticality level associated with said component, wherein the criticality level is or is associated with a required accuracy confidence level of transcribed speech for a given component;
determine that each component of the components meets the required accuracy confidence level;
upon a determination that each component of the components meets the required accuracy confidence level, ensure that the ATC command is able to be executed safely and achieve pilot goals;
upon the ensuring, output a readback of the ATC command to the ATC as voice data, via the radio, such that the ATC is able to confirm accuracy of the aircraft's receipt and transcription of the ATC voice command;
receive, via the radio, a confirmation from the ATC that the readback is accurate; and
execute the ATC command.

14. A system, comprising:
a radio configured to transmit and receive voice transmissions to and from air traffic control (ATC), the radio installed onboard an aircraft; and
at least one processor communicatively coupled to the radio, wherein the at least one processor is installed onboard the aircraft, the at least one processor configured to:
receive an ATC voice command via the radio;
transcribe the ATC voice command into an ATC command;
when the ATC command includes an aircraft identification associated with the aircraft, categorize the ATC command into components, each of the components being categorized based on a criticality level associated with said component, wherein the criticality level is or is associated with a required accuracy confidence level of transcribed speech for a given component; and upon an occurrence of a particular component of the components failing to meet the required accuracy confidence level, output a voice command to the ATC, via the radio, to request that ATC repeat, at least once, the ATC voice command to the aircraft.

15. The system of claim 14, wherein the at least one processor is further configured to: upon a reoccurrence of the particular component of the components failing to meet the required accuracy confidence level a predetermined number of times, execute a lost communication mode.

16. A system, comprising:

a radio configured to transmit and receive voice transmissions to and from air traffic control (ATC), the radio installed onboard an aircraft; and at least one processor communicatively coupled to the radio, wherein the at least one processor is installed onboard the aircraft, the at least one processor configured to:

receive an ATC voice command via the radio;

transcribe the ATC voice command into an ATC command;

when the ATC command includes an aircraft identification associated with the aircraft, categorize the ATC command into components, each of the components being categorized based on a criticality level associated with said component, wherein the criticality level is or is associated with a required accuracy confidence level of transcribed speech for a given component;

determine that each component of the components meets the required accuracy confidence level;

upon a determination that each component of the components meets the required accuracy confidence level, attempt to ensure that the ATC command is able to be executed safely and achieve pilot goals; and upon a failed attempt to ensure that ATC command is able to be executed safely and achieve pilot goals, calculate an alternative safe route.

17. The system of claim 16, wherein the at least one processor is further configured to: generate an alternative voice command corresponding to the alternative safe route; and output the alternative voice command to the ATC, via the radio, to request that ATC approve the alternative voice command.

18. The system of claim 17, wherein the at least one processor is further configured to: receive an ATC voice approval of the alternative voice command via the radio; and execute the alternative voice command.

19. The system of claim 17, wherein the at least one processor is further configured to: fail to receive an ATC voice approval of the alternative voice command via the radio; calculate an additional alternative safe route; generate an additional alternative voice command corresponding to the additional alternative safe route; and output the additional alternative voice command to the ATC, via the radio, to request that ATC approve the additional alternative voice command.

20. The system of claim 17, wherein the at least one processor is further configured to: upon a predetermined number of consecutive failures to receive the ATC voice approval of the alternative voice command or at least one subsequent alternative voice command via the radio, determine an occurrence of an abnormal condition or emergency; calculate an abnormal condition or emergency safe route; generate an abnormal condition or emergency voice intent corresponding to the emergency safe route; output the abnormal condition or emergency voice intent to the ATC, via the radio; and output an abnormal condition or emergency digital intent message to the ATC, via the radio.

* * * * *